H. F. SMITH.
ATTACHMENT FOR LIFTING FALLEN GRAIN FOR SELF BINDERS.
APPLICATION FILED FEB. 9, 1912.

1,200,896. Patented Oct. 10, 1916.

WITNESSES

INVENTOR
Hiram F. Smith
Attorney
George W. Sues.

UNITED STATES PATENT OFFICE.

HIRAM F. SMITH, OF WHITLASH, MONTANA.

ATTACHMENT FOR LIFTING FALLEN GRAIN FOR SELF-BINDERS.

1,200,896.   Specification of Letters Patent.   Patented Oct. 10, 1916.

Application filed February 9, 1912.   Serial No. 676,577.

*To all whom it may concern:*

Be it known that I, HIRAM F. SMITH, a citizen of the United States, and a resident of Whitlash, in the county of Choteau and State of Montana, have invented certain new and useful Improvements in Attachments for Lifting Fallen Grain for Self-Binders, of which the following is a specification, reference being had to the accompanying drawings.

This invention relates to improvements in guards or grain lifting attachments for reapers and binders, mowing machines and the like.

One object of the invention is to provide an attachment of this character adapted to be applied to the platform of a reaper and binder, or to the finger bar of a mowing machine, whereby grain which has fallen or been knocked down by storms or in any other manner or which has a rank tangled growth may be lifted and supported in position to be readily cut by the sickle of the machine to which the guard is attached.

Another object is to provide an attachment of the character described, which will be simple, strong, durable and inexpensive in construction, efficient and reliable in operation and which may be readily applied to a reaper, harvesting or mowing machine, without disturbing or interfering in any manner with the other parts of the same.

With these and other objects in view the present invention consists in the combination and arrangement of parts as will be hereinafter more fully described and finally pointed out in the appended claim, it being further understood that changes in the specific structure shown and described may be made within the scope of the claim, without departing from the spirit of the invention.

Figure 1:
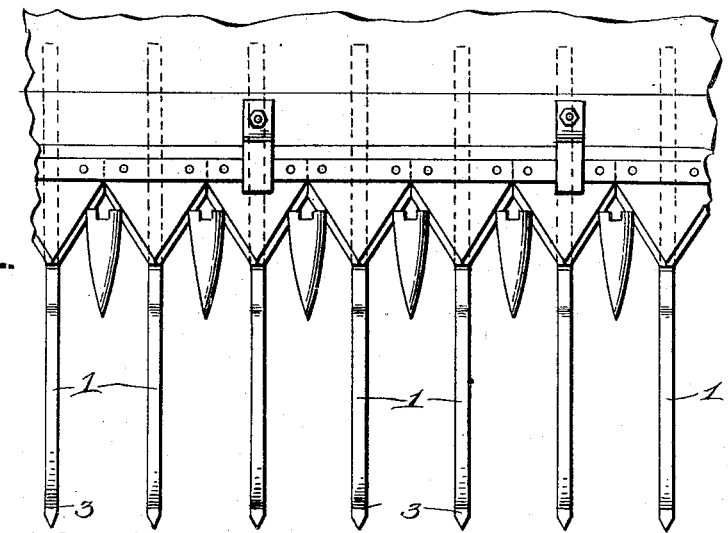
Figure 2:
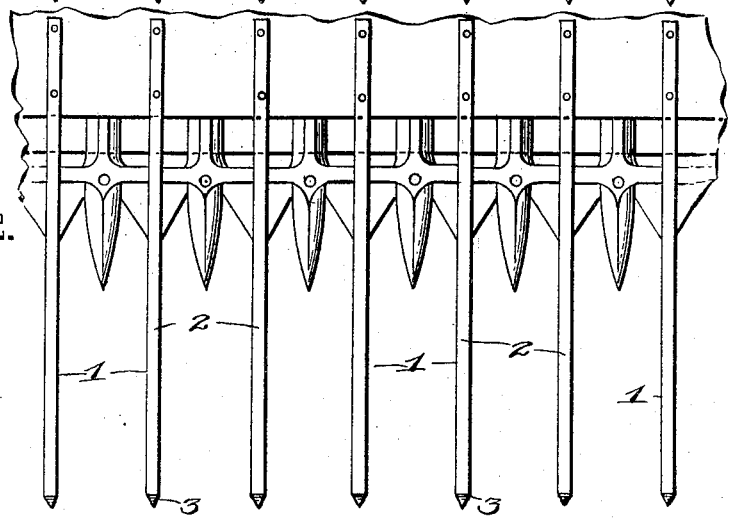
Figure 3:
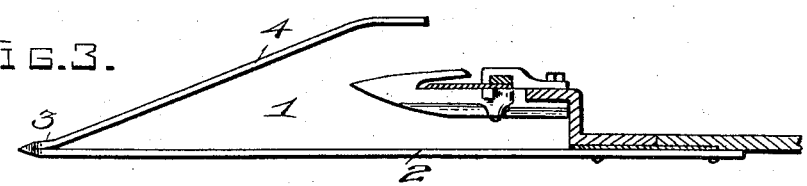
Figure 4:
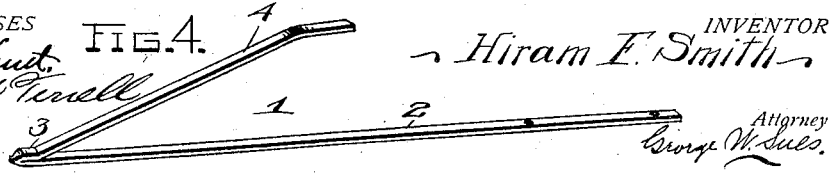

In the accompanying drawings forming a part of this specification and in which like numerals of reference indicate similar parts in the several views: Figure 1, is a plan view of a portion of the platform, finger bar and sickle bar of a reaper, showing the application of the attachment. Fig. 2, is a bottom plan view of the same. Fig. 3 is a transverse sectional view of the same, showing one of the fingers of the attachment in side elevation. Fig. 4, is a detail perspective view of one of the fingers of the attachment.

In harvesting grain, it is impossible, with an ordinary reaper or mower to cut the grain which has been laid or knocked down by storms or from other causes, and grain which is of rank tangled growth frequently causes considerable trouble in harvesting by clogging the sickle bar. By means of my improved lifting attachment these difficulties are entirely overcome and the fallen grain which would otherwise be lost is saved and the yield thus greatly increased.

By reference to the accompanying drawings, it will be seen that my improved grain lifting attachment comprises a series of fingers 1, each of which is formed from a single bar of metal of suitable size, and which by preference is of flat rectangular form in cross section. In forming the fingers the bars are bent upon themselves near one end to form a base or attaching member 2, a grain engaging point 3, an upwardly inclined rearwardly extending grain lifting member 4, the inner end of which is bent parallel with the base member as shown.

In applying the fingers the inner ends of the base members 2 thereof are riveted, bolted or otherwise rigidly secured to the lower side of the platform, finger bar or other suitable part of the machine to which the attachment is applied. The members 2 are of such length that when secured to the machine as stated, the fingers will preferably project about two feet beyond the edge of the sickle bar. The grain lifting members 4 of the fingers preferably terminate on a line with the forward edge of the sickle bar and about six inches above the same.

Any desired number of fingers 1 may be employed and they may be spaced any desired distance apart on the machine. When thus arranged the fingers will engage and lift the fallen grain before the same is reached by the sickle, thus enabling the sickle to readily cut all the grain and permitting the reel arms to push the same on to the platform of the machine. By attaching the fingers to the under side of the platform it places the point of the fingers in advance of and below the sickle bar, thus obviating the necessity of running the sickle so near the ground, as the fingers will raise or lift and hold the grain up over the sickle while being cut.

By means of this attachment fallen grain which cannot be cut at all by an ordinary reaper or mowing machine can be readily cut, and rank tangled grain will be separated and prevented from choking the sickle.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my said invention, what I claim as new and desire to secure by United States Letters Patent, is:

An attachment arranged to be secured to the platform of a reaper carrying a sickle bar, comprising a straight bar of strap metal to provide a base portion secured to the under side of said platform the opposite end of said bar being pointed and bent upon itself and continued in a grain engaging portion from which a finger is continued in an inclined and rearwardly extending grain lifting member, the end of which is bent parallel to said base member said finger being arranged to project a suitable distance beyond the sickle bar, the finger terminating on a line with the forward edge of the sickle bar and above the same, whereby grain which has fallen will be lifted and supported in a position to be cut, as, and in the manner set forth.

In testimony whereof I affix my signature, in presence of two witnesses.

HIRAM F. SMITH.

Witnesses:
 JOHN M. ELLIS,
 ALEX. L. LAKEY.

Copies of this patent may be obtained for five cents each, by addressing the "Commissioner of Patents, Washington, D. C."